United States Patent
Thelen et al.

(12) 
(10) Patent No.: US 6,305,211 B1
(45) Date of Patent: Oct. 23, 2001

(54) TEST ROTOR FOR BALANCING MACHINE

(75) Inventors: Dieter Thelen, Modautal-Brandau; Helmut Nagel, Mörfelden-Walldorf, both of (DE)

(73) Assignee: Schenck Rotec GmbH (DE)

( * ) Notice: Subject to any disclaimer, the term of this patent is extended or adjusted under 35 U.S.C. 154(b) by 0 days.

(21) Appl. No.: 09/443,705

(22) Filed: Nov. 19, 1999

(30) Foreign Application Priority Data

Nov. 25, 1998 (DE) .................................. 198 54 332

(51) Int. Cl.⁷ .................................................. G01M 1/14
(52) U.S. Cl. .................................................. 73/1.14; 73/487
(58) Field of Search ........................... 73/1.14, 460, 468, 73/469, 470, 487; 74/573 R

(56) References Cited

U.S. PATENT DOCUMENTS 4,716,761 * 1/1988 Ito et al. ............................... 73/469

* cited by examiner

*Primary Examiner*—John E. Chapman
(74) *Attorney, Agent, or Firm*—Connolly Bove Lodge & Hutz LLP

(57) ABSTRACT

A test rotor for balancing machines has a plurality of receptacles for test weights. Fitting surfaces are provided beside the receptacles against which fitting surfaces of the test weights are placed. The fitting surfaces for angle positioning are shaped as level surfaces that run in the lengthwise direction of the rotor in order to inexpensively ensure a simple, precise and secure manner for positioning the test weights.

6 Claims, 1 Drawing Sheet

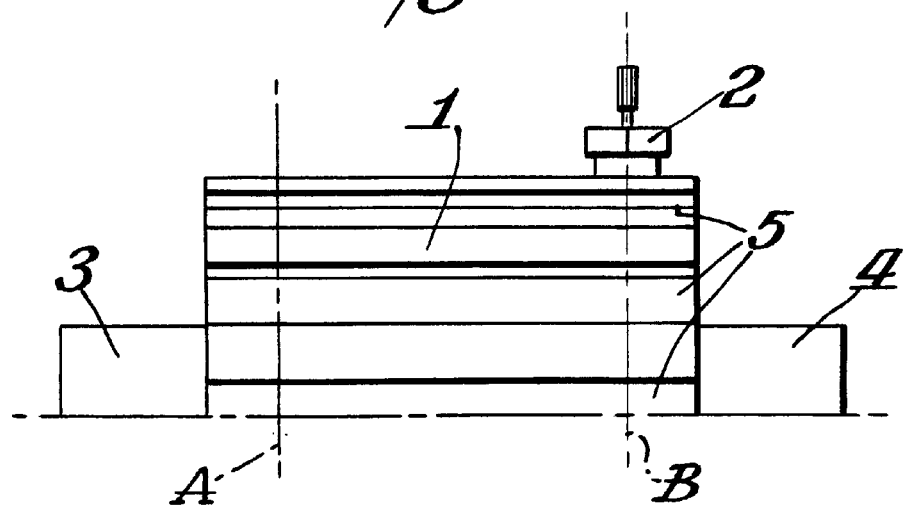
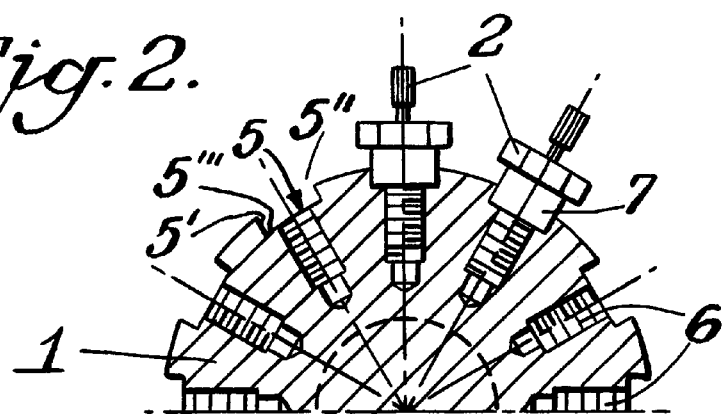
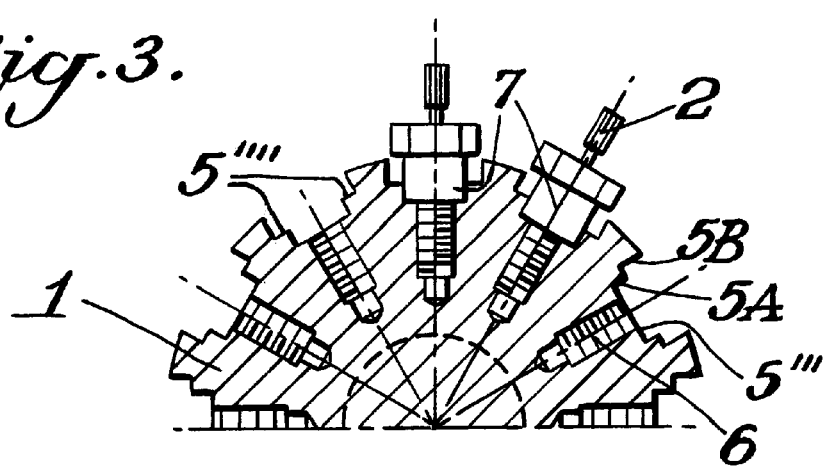

TEST ROTOR FOR BALANCING MACHINE

BACKGROUND OF THE INVENTION

The present invention relates to a test rotor for balancing machines having a plurality of receptacles for test weights in which fitting surfaces are provided becide the receptacles against which fitting surfaces of the test weights are placed.

Balancing machines, particularly universal balancing machines, are checked for precision with test rotors. Such tests are carried out when the machine is initially accepted by the customer or else later as the need arises. With test rotors, for example, the smallest achievable residual unbalance or the unbalance reduction ratio is tested, whereby the test means, i.e. the test rotor and the test weights, as well as the process sequences are all specified in greater detail in International Standard ISO 2953, incorporated herein by reference. Normally, the test weights or test masses are screw fitted along the circumference of the rotor, and their centers of gravity and masses must be precisely known. ISO 2953, Section 10.2.3, provides information about the necessary precision in the three directions, namely, for the distance of the compensation planes in which the test weights must be arranged, for the compensation radii and for the angle positions of the test weights. An unbalance reduction ratio of 95% translates into a tolerance of 0.5%. Thus, for example, the angle position of the test weights has to be accurate to within 0.29°. For this purpose, in a known manner, the test weights are provided with a fitting collar that is associated with a fitting borehole section at the far end of the screw-in borehole on the rotor. When the test weights are screwed in, the fitting surfaces can seize and the threads can be stripped, which then damages the rotor and frequently renders it unusable.

SUMMARY OF THE INVENTION

The present invention is based on the objective of creating a test rotor of the type mentioned above but which is characterized by the simple, precise and secure manner in which the weights are positioned.

The overall objective is achieved, according to the present invention, in that the fitting surfaces for the angle positioning are level surfaces that run in the lengthwise direction of the rotor.

With the invention, it was found for the first time that the placement of the test weights on level fitting surfaces of the rotor in the radial and circumferential directions of the rotor ensures the required positioning precision. It turned out that a fitting surface positioning in the third direction, however, is superfluous. Level, angular-accurate fitting surfaces can be produced more simply and less expensively than fitting boreholes that must be drilled with angular accuracy. This is especially the case when a level fitting surface which has been made in one single operation, for example, by means of milling, is associated with a several receptacles or screw-in boreholes and extends preferably over the entire axial length of the rotor section provided for receiving the test weights. In many cases, the required positioning precision is achieved with the placement of the test weight on just one level fitting surface, which results in further simplification and cost reduction.

Another embodiment of the invention provides that two fitting surfaces that run parallel to each other are provided on both sides, equidistant from the receptacle. Here, it is not necessary to control the placement onto the fitting surface, which is only required with one level fitting surface since, when fitting surfaces are arranged on both sides, the associated surfaces are also automatically placed on both sides. A simple production is ensured if the fitting surfaces are formed by the side surfaces of a longitudinal slot.

An especially advantageous embodiment is one in which the longitudinal slot is stepped and the side surfaces have different distances pairwise since, in this manner, test weights with different fitting collars can be precisely positioned. The diameter of the fitting collar or the width of the slot can also be associated with test weights having different masses.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawing wherein similar reference characters refer to similar parts and in which:

FIG. 1 is a schematic view of a test rotor, according to the present invention;

FIG. 2 is a sectional view taken along line 2—2 of FIG. 1; and

FIG. 3 is a sectional view similar to FIG. 2 but illustrating an alternate embodiment having a fitting surface slot.

DETAILED DESCRIPTION OF THE INVENTION

FIG. 1 shows a rotor 1 in schematic form, wherein the representation is limited to the upper half of the rotor. Two compensation planes A, B, in which receptacles 6 are provided for securing the test weights 2, are shown with dashed lines. The rotor 1 can be supported with its bearing journals 3, 4 in the bearings of the balancing machine to be tested.

The rotor 1 has a plurality of slots 5, twelve in the example shown, which are arranged on the outer circumference, which run in the lengthwise direction of the rotor and which are distributed at the same angular distance over the circumference. They extend entirely over the section of the rotor 1 that has a larger diameter vis-à-vis the bearing journals 3, 4.

However, it is possible for longitudinal slots 5 to extend in the axial direction only in the area of the compensation planes A, B, since this is the only place where the test weights 2 are to be placed.

In the middle, between the side walls 5' and 5" of the longitudinal slots 5, the receptacles for the test weights 2 are arranged in the compensation planes A, B. In the examples shown in FIGS. 2 and 3, these are threaded pocket holes 6. For each compensation planes A, B, corresponding to the number of slots, there are twelve threaded pocket holes 6. The threaded pocket holes 6 extend radially from the base of the longitudinal slots towards the inside.

Depending on the test specifications, test weights 2 can be screwed into the threaded pocket holes 6. The test weights 2 have a threaded section as well as a fitting collar 7. When the test weight is screwed into the threaded pocket holes 6, its angular position is centered as a result of the interaction of the fitting collar 7 with the side walls 5' and 5" of the longitudinal slots 5 which function as counter-fitting surfaces. As the fitting surface 5''' the support in the radial direction on the slot base defines the position of the compensation radius, whereas the position in the compensation planes A, B is defined exclusively by the threaded connection.

In FIG. 3, the longitudinal slots 5 have a modified profile. Here, a second longitudinal slot 5B is formed above a radially lower longitudinal slot 5A. The shoulder surfaces 5''', which are located between the two longitudinal slots 5A, 5B, form fitting surfaces in the radial direction of the rotor to receive test weights 2 having a fitting collar diameter that corresponds to the width of the second longitudinal slot 5B, whereas the slot base of the radially lower longitudinal slot 5A forms the fitting surface that serves to receive the test weights 2 having a fitting collar diameter that corresponds to the width of the lower longitudinal slot 5A. In this manner, different sets of test weighs may be placed and positioned on the test rotor 1, as needed.

What is claimed is:

1. A test rotor for balancing machines having a plurality of receptacles for test weights in which fitting surfaces are provided on the receptacles against which fitting surfaces of the test weights are placed, and wherein the fitting surfaces for angle positioning are flat side surfaces (5', 5") that run in the lengthwise direction of the rotor.

2. A test rotor as in claim 1 wherein two fitting surfaces running parallel to each other are provided on both sides of each receptacle.

3. A test rotor as in claim 1 wherein each receptacle is configured as a pocket hole (6).

4. A test rotor as in claim 1 wherein the fitting surfaces extend over the entire axial length of the rotor section provided for receiving the test weights (2).

5. A test rotor as in claim 1 wherein the flat side surfaces (5', 5") of a longitudinal slot (5, 5A, 5B) constitute the fitting surfaces.

6. A test rotor as in claim 5 wherein the longitudinal slot (5A, 5B) is stepped and the side surfaces are at different distances pairwise.

* * * * *

UNITED STATES PATENT AND TRADEMARK OFFICE
CERTIFICATE OF CORRECTION

PATENT NO. : 6,305,211 B1
DATED : October 23, 2001
INVENTOR(S) : Dieter Thelen and Helmut Nagel It is certified that error appears in the above-identified patent and that said Letters Patent is hereby corrected as shown below:

Column 1,
Line 6, delete "becide" and insert -- beside --.
Line 55, delete "a" before "several".

Column 3,
Line 17, delete "on" and insert -- beside --.

Signed and Sealed this

Eleventh Day of June, 2002

*Attest:*

*Attesting Officer*

JAMES E. ROGAN
*Director of the United States Patent and Trademark Office*